US006456337B1

(12) United States Patent
Kobayashi et al.

(10) Patent No.: US 6,456,337 B1
(45) Date of Patent: Sep. 24, 2002

(54) MOVING IMAGE CORRECTING CIRCUIT FOR DISPLAY DEVICE

(75) Inventors: Masayuki Kobayashi; Masamichi Nakajima; Hayato Denda, all of Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/380,357

(22) PCT Filed: Mar. 4, 1998

(86) PCT No.: PCT/JP98/00888

§ 371 (c)(1),
(2), (4) Date: Aug. 27, 1999

(87) PCT Pub. No.: WO98/39764

PCT Pub. Date: Sep. 11, 1998

(30) Foreign Application Priority Data

| | | |
|---|---|---|
| Mar. 6, 1997 | (JP) | 9-069295 |
| Mar. 28, 1997 | (JP) | 9-094902 |
| Jul. 25, 1997 | (JP) | 9-213954 |

(51) Int. Cl.[7] .......... H04N 5/14

(52) U.S. Cl. .......... 348/701; 348/792; 348/793; 348/615

(58) Field of Search .......... 348/699–601, 348/452, 739, 792, 793, 615, 607

(56) References Cited

U.S. PATENT DOCUMENTS

| | | | | |
|---|---|---|---|---|
| 5,162,907 A | * 11/1992 | Kenting et al. | 348/452 |
| 5,469,226 A | * 11/1995 | David et al. | 348/699 |
| 5,903,313 A | * 5/1999 | Tucker et al. | 348/699 |
| 6,031,582 A | * 2/2000 | Nishikawa et al. | 348/699 |
| 6,078,618 A | * 6/2000 | Yokoyama et al. | 375/240 |
| 6,081,553 A | * 6/2000 | Kitson et al. | 375/240 |
| 6,178,265 B1 | * 1/2001 | Haghighi | 382/236 |

FOREIGN PATENT DOCUMENTS

| | | |
|---|---|---|
| JP | 8-9340 | 1/1996 |
| JP | 8-211848 | 8/1996 |

* cited by examiner

*Primary Examiner*—Victor R. Kostak
(74) *Attorney, Agent, or Firm*—Flynn, Thiel, Boutell & Tanis, P.C.

(57) ABSTRACT

In a moving image correcting circuit for a display unit wherein a motion vector detecting portion detects inter-frame motion vectors and a moving image correcting position corrects the display positions of subfields for pixels in blocks, based on the detection values, the picture quality is protected from being degraded by preventing the output of an erroneous motion vector due to noise in, or fluctuation of, the input image signal or else preventing the erroneous motion vector, even if output from the motion vector detecting portion, from entering the moving image correcting portion.

11 Claims, 13 Drawing Sheets

FIG. 4a (PRIOR ART)
Preceding frame picture
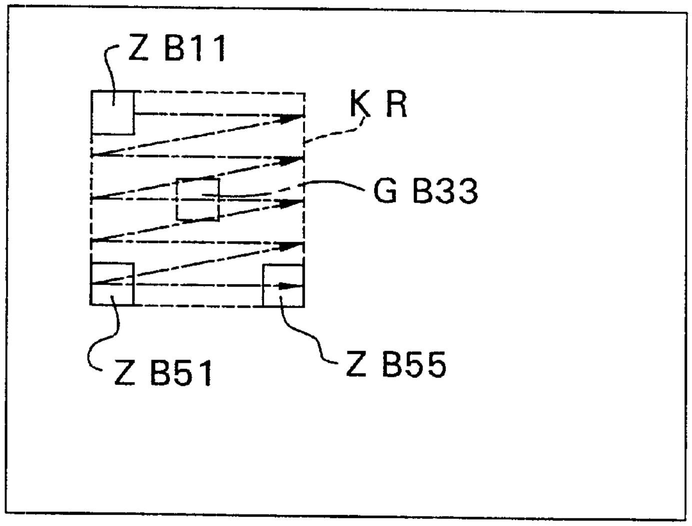
Current frame picture
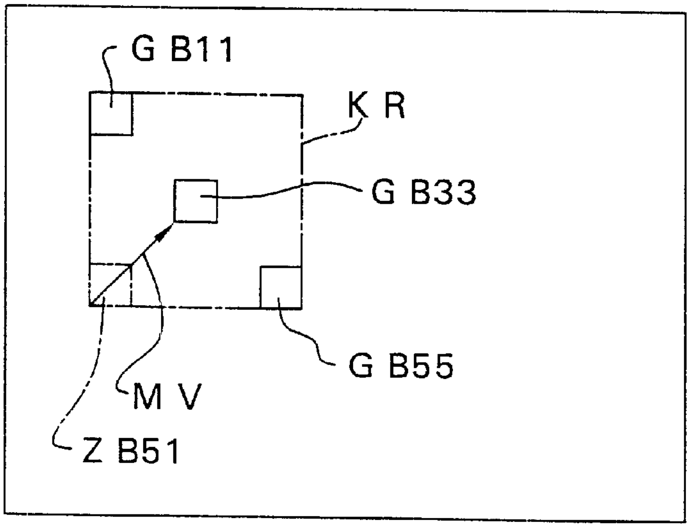
FIG. 4b (PRIOR ART)

FIG. 5a (PRIOR ART)
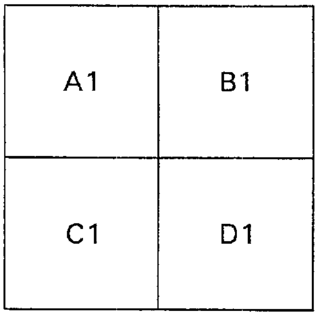
Blocks in the preceding frame picture
FIG. 5b (PRIOR ART)
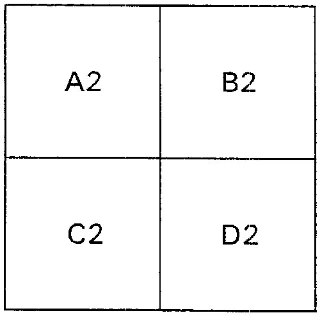
Blocks in the current frame picture
FIG. 6 (PRIOR ART)
Vertical vector (columns) / Horizontal vector (rows)
| | -4 | -3 | -2 | -1 | 0 | 1 | 2 | 3 | 4 |
|---|---|---|---|---|---|---|---|---|---|
| -4 | 100 | 100 | 100 | 100 | 100 | 100 | 100 | 100 | 100 |
| -3 | 100 | 100 | 100 | 100 | 100 | 100 | 100 | 100 | 100 |
| -2 | 100 | 100 | 100 | 100 | 100 | 100 | 100 | 100 | 100 |
| -1 | 100 | 100 | 100 | 100 | 100 | 100 | 50 | 100 | 100 |
| 0 | 100 | 100 | 100 | 50 | 20 | 20 | 50 | 100 | 100 |
| 1 | 100 | 100 | 20 | 12 | 10 | 12 | 100 | 100 | 100 |
| 2 | 100 | 100 | 100 | 20 | 12 | 50 | 100 | 100 | 100 |
| 3 | 100 | 9 | 100 | 100 | 100 | 100 | 100 | 100 | 100 |
| 4 | 100 | 100 | 100 | 100 | 100 | 100 | 100 | 100 | 100 |
Z B55
Z B82
Z B65

FIG. 10a

Correlation value data1

Vertical vector (columns) / Horizontal vector (rows)

| | -4 | -3 | -2 | -1 | 0 | 1 | 2 | 3 | 4 |
|---|---|---|---|---|---|---|---|---|---|
| -4 | 100 | 100 | 100 | 100 | 100 | 100 | 100 | 100 | 100 |
| -3 | 100 | 100 | 100 | 100 | 100 | 100 | 100 | 100 | 100 |
| -2 | 100 | 100 | 100 | 100 | 100 | 100 | 100 | 100 | 100 |
| -1 | 100 | 100 | 100 | 100 | 100 | 100 | 50 | 100 | 100 |
| 0 | 100 | 100 | 100 | 50 | 20 | 20 | 50 | 100 | 100 |
| 1 | 100 | 100 | 20 | 12 | 10 | 12 | 100 | 100 | 100 |
| 2 | 100 | 100 | 100 | 20 | 12 | 50 | 100 | 100 | 100 |
| 3 | 100 | 9 | 100 | 100 | 100 | 100 | 100 | 100 | 100 |
| 4 | 100 | 100 | 100 | 100 | 100 | 100 | 100 | 100 | 100 |

Z B55
Z B66
Z B82
Z B64
Z B65
Z B75

FIG. 10b

Correlation value data2

Vertical vector (columns) / Horizontal vector (rows)

| | -4 | -3 | -2 | -1 | 0 | 1 | 2 | 3 | 4 |
|---|---|---|---|---|---|---|---|---|---|
| -4 | 100 | 100 | 100 | 100 | 100 | 100 | 100 | 100 | 100 |
| -3 | 100 | 100 | 100 | 100 | 100 | 100 | 100 | 100 | 100 |
| -2 | 100 | 100 | 100 | 100 | 100 | 100 | 100 | 100 | 100 |
| -1 | 100 | 100 | 100 | 100 | 100 | 100 | 50 | 100 | 100 |
| 0 | 100 | 100 | 100 | 50 | 20 | 20 | 50 | 100 | 100 |
| 1 | 100 | 100 | 20 | 0 | 0 | 0 | 100 | 100 | 100 |
| 2 | 100 | 100 | 100 | 20 | 0 | 50 | 100 | 100 | 100 |
| 3 | 100 | 0 | 100 | 100 | 100 | 100 | 100 | 100 | 100 |
| 4 | 100 | 100 | 100 | 100 | 100 | 100 | 100 | 100 | 100 |

Z B55
Z B66
Z B82
Z B64
Z B65
Z B75

MOVING IMAGE CORRECTING CIRCUIT FOR DISPLAY DEVICE

TECHNICAL FIELD

The invention relates to a moving image correcting circuit of a display device that displays a multitonal image by time-sharing one frame into plural subfields (or subframes) and emitting the subfields corresponding to the luminance level of an input image signal.

BACKGROUND TECHNOLOGY

Display devices using a PDP (Plasma Display Panel) and a LCD (Liquid Crystal Panel) have been attracting public attention as thin, light-weight display units. Completely different from the conventional CRT driving method, the driving method of this PDP is a direct drive by a digitalized image input signal. The luminance tone as emitted from the panel face depends therefore on the number of bits of the signal to be processed.

The PDP may roughly be divided into AC and DC types whose fundamental characteristics differ from each other. In any AC type PDP, sufficient characteristics have been obtained with respect to its luminance and service life. As for the tonal display, however, a 64-tone display was the maximum reported from the trial manufacture level. Recently, a future 256-tone method by Address/Display Separation type drive method (ADS subfield method) has been proposed.

FIGS. 1(*a*) and (*b*) show the exemplary drive sequence and drive waveform of the PDP used in this ADS subfield method with 8 bits and 256 tones.

In FIG. 1(*a*). one frame is composed of eight subfileds SF1, SF2, SF3, SF4, SF5, SF6, SF7, and SF8 whose relative ratios of luminance are 1, 2, 4, 8, 16, 32, 64, and 128 respectively. Combination of this luminance of eight screens enables a display in 256 tones.

In FIG. 1(*b*), the respective subfields are composed of the address duration that writes one screen of refreshed data and the sustaining duration that defines the luminance level of these subfields. In the address duration, a wall charge is formed initially at each pixel simultaneously over all the screens, and then the sustaining pulses are given to all the screens for display. The brightness of the subfield is proportional to the number of sustaining pulses to be set to the predetermined luminance. A two hundred and fifty-six tone display is thus actualized.

The foregoing display unit of address/display separation type drive method was conventionally provided with such a moving image correcting circuit as shown in FIG. 2 in order to reduce the visual display deviation resulting from the display of a moving image. The moving image correcting circuit shown in FIG. 2 comprised the moving image correcting portion 11 and the motion vector detecting portion 10, which in turn consisted, as shown in FIG. 3, of the frame memory 12, correlation value operation part 13 and motion vector generating portion 14.

In the motion vector detecting portion 10, the respective components act as follows. Based on the image signal as input into the input terminal 15, the frame memory 12 makes an image signal by one frame before the current frame picture (referred to as "preceding frame picture"). The correlation value operation part 13 sequentially seeks after the correlation values (differential values) of the image signal for all the blocks in the detection area of the motion vectors in the preceding frame, referring to the block forming the subject of the current frame picture (the block consisting of a single or plural pixels, 2×2 pixels, for example). The motion vector generating portion 14 generates a displacement vector (a signal representing displacement direction and displacement amount) whose starting point and end point are the block position of the preceding frame picture where the correlation value is minimal and the origin of the motion vector (the block position of the preceding frame picture at a position corresponding to the block of current frame picture) respectively. The motion vector generating portion 14 generates this displacement vector as a motion vector of the block forming the subject.

In the moving image correcting portion 11, the image signal as input into the input terminal 15 was corrected on the basis of the detected value of the motion vector detecting portion 10 (namely, the motion vector). The image signal thus corrected was output to the PDP (not shown) through the intermediary of the output terminal 16. The moving image was thus corrected by correcting the display position of each subfield for the pixels in the subject block.

We will now describe in detail how the correlation value operation part 13 in the motion vector detecting portion 10 operates the correlation values. For purpose of discussion, we assume here that, as shown in FIGS. 4(*a*) and (*b*), the detection area KR of the motion vector of the preceding frame picture has 25 blocks (5×5 blocks) and that the image (pictorial image) that was at the position of the block ZB51 in this detection area KR has now displaced to the position of the block GB33 in the current frame picture. Further, it is assumed that the blocks ZB11 to ZB65 of the preceding frame picture and the blocks GB11 to GB55 of the current frame picture are formed respectively with 2×2 pixels (or as many dots).

If the subject block of the current frame picture is GB33, the correlation value operation part 13 will sequentially compute, by the following expression, $$S=|A1-A2|+|B1-B2|+|C1-C2|+|D1-D2|$$

the correlation values of an image signal for all the blocks ZB11 to ZB55 in the detection area KR of the preceding frame picture referring, as datum, to this block GB33, all along the direction shown by the alternate long and two short dashed line arrow in FIG. 4(*a*).

In the formula, A1, B1, C1, and D1 represent the luminance levels of the pixels forming the respective blocks of preceding frame picture ZB11 to ZB55 as shown in FIG. 5(*a*), while A2, B2, C2, and D2 indicate the luminance levels of the pixels forming the subject block of current frame picture GB33 as shown in FIG. 5(*b*).

The motion vector generating portion 14 compares the plural correlation values as obtained in the correlation value operation part 13 with each other, and generates, as shown by the thick lines in FIG. 4(*b*), the displacement vector MV whose starting and end points are respectively the position of the block B51 of the preceding frame picture where the correlation value is minimal and the origin of the motion vector (block ZB33 position of preceding frame picture corresponding to the block GB33 in the current frame picture). The motion vector generating portion 14 then outputs this vector MV as the motion picture of the subject block GB33.

The motion vectors can be obtained in a similar fashion also for other blocks (for instance, GB11 or GB55) of the current frame picture, when the motion vector detection area KR of the preceding frame picture embraces 25 peripheral blocks (5×5 blocks) centered around the corresponding origin (for example, positions of the blocks of preceding frame picture ZB11 or ZB55 corresponding to the block GB11 or GB55).

Since, however, the block position corresponding to the least correlation value does not always coincide with the starting point (or end point) of the displacement vector if any dispersion appears in the correlation value as obtained from the correlation value operation part 13 due, for example, to the noise in the input image signal or to the fluctuation of the input image signal, there were some cases where erroneous motion vectors were detected that differed from the intrinsic motion vectors representing the motion as viewed by humans.

For simplicity, we may assume that the detection area KR of a preceding frame picture is 9×9=81 blocks and that the correlation values obtained from the correlation value operation part 13 for the blocks ZB11 to ZB99 in this detection area KR is as shown in FIG. 6. Let us also assume that a correlation value, out of those in FIG. 6, for the block ZB65 near the origin of the preceding frame picture (block ZB55 position at vertical vector "0" and horizontal vector "0") changes from intrinsic "0" to "10" and the correlation value for the block ZB82 away from the origin changes from intrinsic "20" to "9", both by reason of noise, fluctuation or the like. Under these conditions, the motion vector generating portion 14 compares the correlation values shown in FIG. 6 with each other, and generates and outputs a motion vector whose starting point and end point are respectively the block ZB82 position corresponding to the least correlation value "9" and the origin. Namely, as shown in FIG. 6, not the motion vector with horizontal vector "0" and vertical vector 1 with, as the starting point, the block B65 position corresponding to the intrinsic least correlation value "0", but an erroneous motion vector with horizontal vector "−3" and vertical vector "3" with the block B82 as starting point is output.

The conventional art was therefore problematical in that the moving image correction conversely worsens the picture qualify if the moving image is corrected by the moving image correcting portion 11 based on the foregoing erroneous motion vector.

Let us take it for granted that, for example as shown in FIGS. 7(*a*) and (*b*), in the nine blocks (3×3 blocks) B11 to B33, the detected value of the motion vector of the central block B22 changes from "2" or "3" to "5" due to the influence of noise, fluctuation or the like, and that the detected values of the motion vectors of the 8 peripheral blocks B11 to B33 (except B22) remain "2" or "3" without being affected by any noise or fluctuation. Then, for any pixels in the eight peripheral blocks B11 to B33 (except B22) the moving image can be corrected on the basis of a correct detected values "2" or "3" while for any pixels in the central block B22 the moving image correction is committed on the basis of erroneously detected value "5". Thus, the prior art was problematical in that, ironically, the correction of the moving image caused the picture quality to be degraded.

It is also to be assumed that, as shown in FIG. 8, there is no motion vector detected (no motion) for the three blocks B13, B22, and B33 influenced by noise, fluctuation or the like out of the nine (3×3 blocks) B11 to B33, and that motion vectors are detected (hatched portions in the figure) for the six remaining blocks B11, B12, B21, B23, B31 and B32 without any influence of noise or fluctuation. Then, the moving image correction intended for enhancing the picture quality may be performed for the pixels in the six blocks B11, B12, B21, B23, B31 and B32 from which the motion vectors have been detected, but no moving image can be corrected for any pixels in the three blocks B13, B22, and B33 from which no motion vector has been detected. The result was the same. That is, such a moving image correction was problematical in that it conversely caused the degradation of the picture quality.

The invention, made in light of the foregoing problematical points, is intended to prevent the picture quality from worsening due to the noise in or fluctuation of an input image signal if the moving image is corrected to reduce any visual display deviation engendered when displaying the moving image in a display device that displays a multitonal image by time-sharing one frame into plural subfields and emitting the subfields corresponding to the luminance level of an input image signal.

DISCLOSURE OF THE INVENTION

The moving image correction circuit by the first invention is characterized in that in a display device that displays a multitonal image by time-sharing one frame into plural subfields and emitting the subfields corresponding to the luminance level of an input image signal, said circuit has a motion vector detecting portion that detects the motion vector in a single frame or inter-frame blocks (for instance, 2×2 pixels) on the basis of said input image signal, and the moving image correcting portion that outputs, to said display device, the signal which corrected the display position of respective subfields for the pixels in the blocks, based on the detected value of said motion vector detecting portion, wherein said motion vector detecting portion has a correlation value operation portion that operates the correlation values of the image signal corresponding to all the blocks in the detection area of the preceding frame picture on the basis of the blocks forming the subject of the current frame picture, a least correlation value detecting portion that detects the least correlation value S1 having the highest correlation among the plural correlation values as obtained in said correlation value operation portion, a multiplier that multiplies this least correlation value S1 by a coefficient k (k>1), a correlation value converting portion that converts the correlation values not more than the multiplied value k×S1 from among the plural correlation values as obtained in the correlation value operation portion into a set correlation value S2 (S2≦S1) and outputs this value S2, and a motion vector generating portion that detects the correlation value corresponding to the block the nearest to the origin from among the set correlation values S2 as output from said correlation value converting portion, generates a displacement vector whose starting point and end point are the block position corresponding to said detected correlation value and the origin respectively, and outputs this displacement vector as a motion vector.

For ease of explanation, let us consider a case where the correlation value obtained in the correlation value operation part suffers a dispersion due to noise, fluctuation or the like, the least correlation value S1 (9 for example) detected from the least correlation value detecting portion is that corresponding to an erroneous block away from the origin, and the intrinsic least correlation value ("0" for example) corresponding to a block near the origin changes into a correlation value S1*a* (for example, "10") larger than S1. In such a similar, conventional case as shown in FIG. 6, an erroneous motion vector is detected whose starting and end points are the block position corresponding to the least correlation value S1 and the origin respectively. In our case, however, such an erroneous motion vector is kept from being detected by the first invention. That is, the correlation value converting portion converts the correlation value not larger than the multiplied value K×S1 (1.5×S1 for example) from among the correlation values obtained in the correlation value operation part, into a set correlation value S2 not larger than S1 ("0" for example) to include the correlation value S1*a* before the conversion in the least correlation value (S2) forming the subject of detection.

The motion vector generating portion detects the correlation value corresponding to the block the nearest to the origin from among plural least correlation values (corresponding to the correlation value S1*a* before the conversion), and generates a displacement vector whose starting point and end point are the block position corresponding to said detected correlation value and the origin respectively and outputs this displacement vector as a motion vector. This configuration may prevent the motion vector detecting portion from outputting an erroneous motion vector due to noise, fluctuation or the like, avoiding thus the degradation of picture quality in the correction of moving images in the moving image correcting portion.

The moving image correction circuit of the second invention is characterized in that in a display device that displays a multitonal image by time-sharing one frame into plural subfields and emitting the subfields corresponding to the luminance level of an input image signal, said circuit has a motion vector detecting portion that detects the motion vector in a single frame or inter-frame blocks based on the input image signal, a majority processing portion that seeks after the most numerous identical detected values from among the detected values detected by the motion vector detecting portion for all the blocks within the set range S including the subject block, and a moving image correcting portion that outputs, to said display device, the signal which corrects the display position of respective subfields of the pixels in the subject block, based on the detected value as obtained in said majority processing portion.

We now consider a case where one frame is time-shared into n number of subfields SFn to SF1 to display a multitonal image of n bits of an input image signal. The motion vector detecting portion detects the displacement direction (upward on the screen, for example) and displacement amount (5 dots or 5 pixels per frame) of inter-frame blocks (that is, detects the motion vector). The majority processing portion seeks after the most numerous, identical detected values from among the detected values by the motion vector detecting portion for the blocks within the set range S. The moving image correcting portion corrects the input image signal based on the detected value as obtained in the majority processing portion and outputs this signal as corrected to the display device. This configuration allows the majority processing to eliminate an uneven motion vector even if the motion vector detecting portion outputs any erroneous motion vectors due to noise, fluctuation or the like, thereby keeping the picture quality from being degraded in the moving image correcting process.

The moving image correction circuit of the third invention is characterized in that in a display device that displays a multitonal image by time-sharing one frame into plural subfields and emitting the subfields corresponding to the luminance level of the input image signal, said circuit has a motion vector detecting portion that detects the motion vector in a single frame or inter-frame blocks on the basis of the input image signal, a majority processing portion that seeks after the most numerous identical detected values from among the values detected by the motion vector detecting portion for all the blocks within the set range S including the subject block, a vertical/horizontal/oblique detecting portion that detects whether or not the blocks having identical detected values by the motion vector detecting portion have been continuously arranged vertically, horizontally or obliquely within the set range S including the subject block and outputs the identical detected values when detecting, a selector that selects the detected values as output from this vertical/horizontal/oblique detecting portion if there is any detection output therefrom and selects the detected values obtained in the majority processing portion if there is no such detection output, and a moving image correcting portion that outputs, to said display device, the signal which corrected the display position of respective subfields of the pixels in the subject block, based on the detected value as selected by this selector.

As is the case with the foregoing second invention, this configuration, namely the third invention allows the majority processing to eliminate uneven motion vectors even if the motion vector detecting portion outputs any erroneous motion vectors due to noise, fluctuation or the like, thereby keeping the picture quality from being degraded in the moving image correcting process. Since this third invention is so designed that, when an image with one respective vertical, horizontal and oblique lines moves toward a predetermined direction, the detected values of this image with vertical, horizontal and oblique lines are made to supersede, by means of the detection output of the vertical/horizontal/oblique detecting portion, the detection values obtained by majority processing, an exact moving image correction can be performed deep in detail into the image.

The moving image correction circuit of the fourth invention is characterized in that in a display device that displays a multitonal image by time-sharing one frame into plural subfields and emitting the subfields corresponding to the luminance level of the input image signal, said circuit has a motion vector detecting portion that detects the motion vector in a single frame or inter-frame blocks on the basis of the input image signal, a motion vector delaying portion that seeks after the motion vector of each block in the set range S consisting of the subject block and peripheral blocks by delaying the detection value of said motion vector detecting portion, a motion vector counting portion that counts the number of the blocks detected as having motion vectors in all the blocks within the set range S, a count comparing portion that compares if the count by said motion vector counting portion is superior to the set value or not, a motion vector embedding portion that outputs the motion vector based on the output from the motion vector delaying portion and that of the count comparing portion, and a moving image correcting portion that outputs to the display device the signal which corrects the display position of each subfield of pixels within the subject block on the basis of the motion vector as output from said motion vector embedding portion, wherein said motion vector embedding portion outputs, as the motion vector of the subject block, the blocks of the motion vectors detected as having motion vectors within the set range S, when there is no motion vector of subject block as obtained in the motion vector delaying portion and that the count comparing portion is sending out a comparison signal, and otherwise outputs the motion vector of the subject block as obtained in the motion vector delaying portion.

When there is no motion vector of the subject block as obtained from the motion vector delaying portion and the count comparing portion is sending out a comparison signal, the motion vector embedding portion outputs, as the motion vector, and to the moving correcting portion, the motion vector of the blocks detected as having the motion vector in the set range S. That is, when the number of the blocks detected as having a motion vector in the set range S is superior to the set value, the motion vector of the subject block is embedded (substituted) with the motion vector of the blocks detected as having a motion vector even if there is no motion vector of the subject block. This makes it possible that the display position of each subfield may be corrected for the pixels in the subject block on the basis of the motion vector as embedded by the motion vector embedding portion, even if the motion vector has not been detected by reason of noise, fluctuation or the like, despite the very existence of the motion vector. The dispersion in the subject block and peripheral blocks being thus annihilated, the moving image can be corrected without deteriorating the picture quality.

The moving image correcting portion of the $5^{th}$, $6^{th}$ and $7^{th}$ inventions replacing the motion vector detecting portion, one of the components of the foregoing $2^{nd}$, $3^{rd}$, and $4^{th}$ inventions, with the motion vector detecting portion, one of the components of the first invention, prevents any erroneous motion vector from being output from the upstream motion vector detecting portion. At the same time, the downstream circuit keeps any erroneous motion vector from entering the moving image correcting portion, even when an erroneous motion vector may come out of the motion vector detecting portion. This configuration makes it possible to keep, with higher precision, the picture quality from being degraded in the correction of a moving image by the moving image correcting portion.

BRIEF DESCRIPTION OF THE DRAWINGS

FIG. 4 describes the action of FIG. 3, wherein (a) is a schematic diagram of a preceding frame picture, and (b) shows the current frame picture.

FIG. 5 depicts an exemplary configuration of blocks intended to illustrate how to compute the correlation values, wherein (a) is a diagram showing that the luminance levels of respective pixels constituting the blocks (2×2 pixels) of the preceding frame picture are A1, B1, C1, and D1, while (b) shows that the luminance levels of respective pixels constituting the blocks (2×2 pixels) of the current frame picture are A2, B2, C2, and D2.

FIG. 6 is an exemplary illustration of the correlation value data when there arises some dispersion due to noise, fluctuation or the like in the correlation values as obtained from the correlation value operation part.

FIG. 10 depicts the correlation value data before and after the conversion at the correlation value data converting portion, wherein (a) illustrates the correlation value data 1 before the conversion, and (b) the correlation value data 2 after the conversion.

BEST EMBODIMENT TO CARRY OUT THE INVENTION

Referring now more particularly to the attached drawings, this invention will be described more in detail.

Figure 1A:
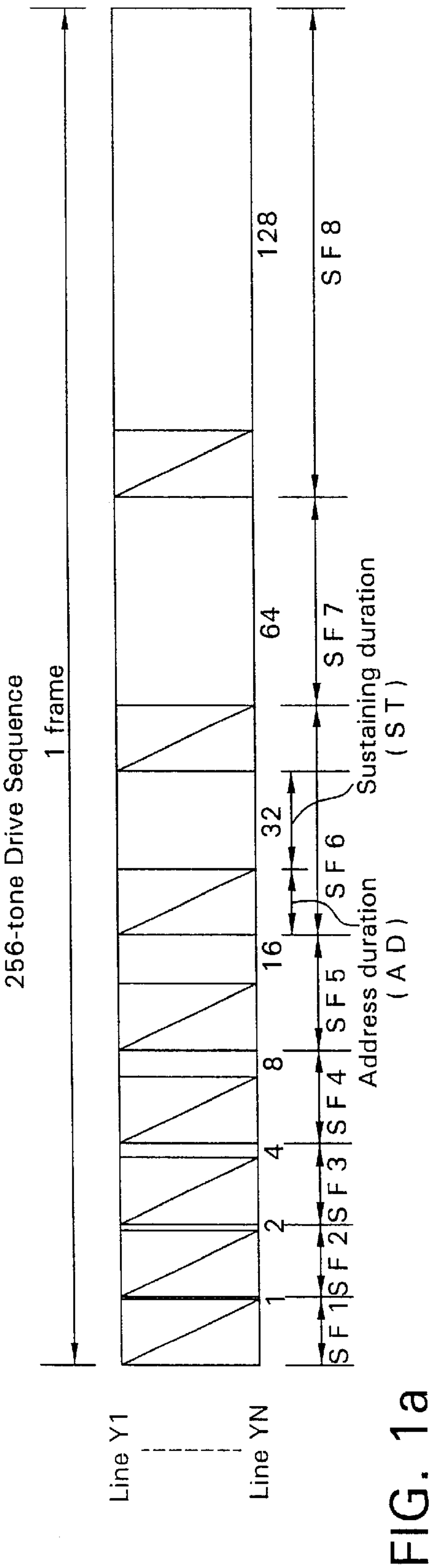
FIG. 1 diagrammatically illustrates the address/display separation type drive method, in which (a) is an explanatory diagram of a 256-tone drive sequence, and (b) shows some drive waveforms.
Figure 1B:
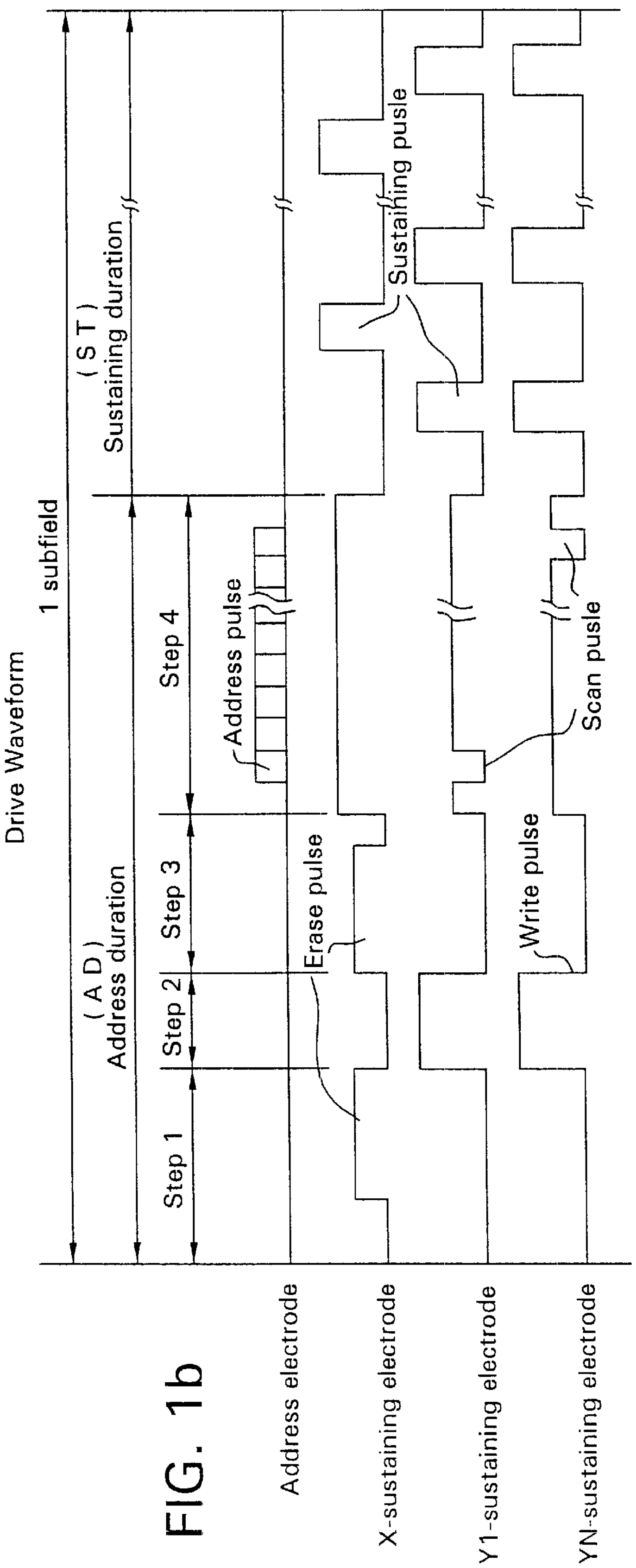
Figure 2:
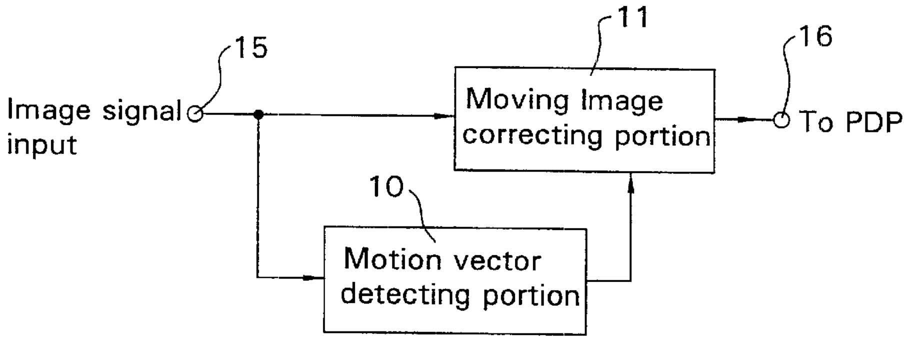
FIG. 2 (PRIOR ART)
FIG. 2 is a block diagram showing the moving image correcting circuit for a display device in a conventional embodiment.
Figure 3:
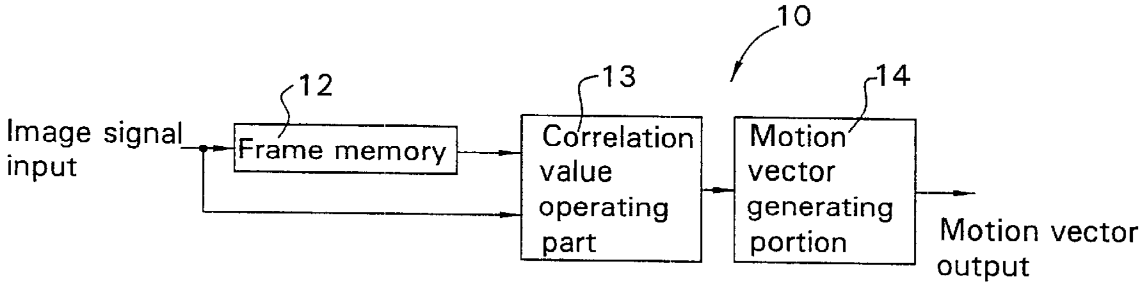
FIG. 3 (PRIOR ART)
FIG. 3 is another block diagram that shows the motion vector detecting portion in FIG. 2.
Figure 9:
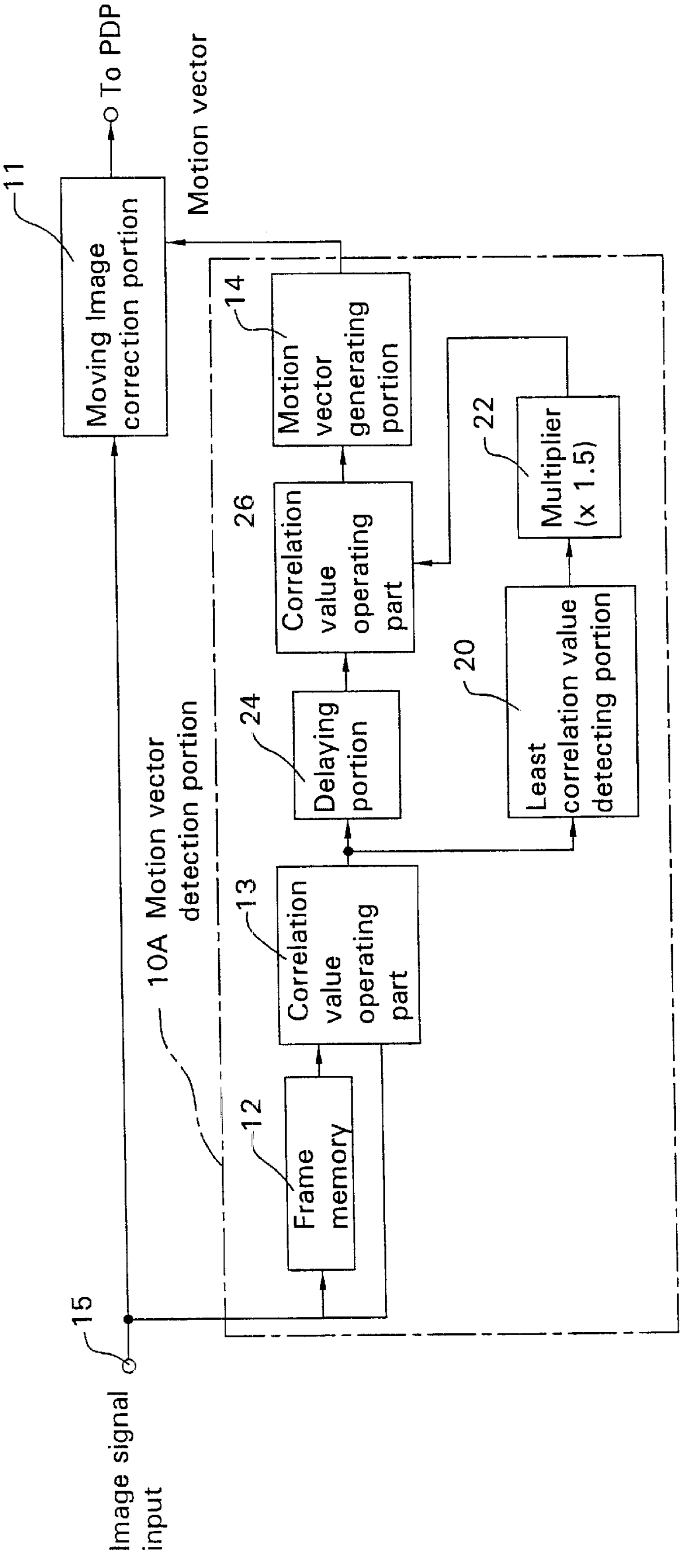
FIG. 9 is a block diagram showing an embodiment of the moving image correcting circuit by the first invention.

FIG. 9 shows an embodiment of the moving image correcting circuit of the first invention, wherein like reference characters designate like or corresponding parts in FIGS. 2 and 3. In FIG. 9, 10A represents the motion vector detecting portion, 11 is the moving image correcting portion, and said motion vector detecting portion 10A comprises the frame memory 12, the correlation value operation part 13, the least correlation value detecting portion 20, the multiplier 22, the delaying portion 24, the correlation value converting portion 26, and the motion vector generating portion 14.

Said frame memory 12 delays by one frame the image signal as input into the input terminal 15 to generate the image signal of the preceding frame picture, which is output to the correlation value operation part 13.

Said correlation value operation part 13 sequentially seeks after and outputs the correlation values (differential values) with all the blocks (for example, ZB11 to ZB55 In FIGS. 4(*a*)) within the detection area KR of the motion vector in the preceding frame picture referring to the block GB forming the subject of the current frame picture (for example, GB33 in FIG. 4(*b*)).

Said least correlation value detecting portion 20 detects the least correlation value S1 with highest correlation from among the plural correlation values obtained at said correlation value operation part 13, and outputs the least correlation value S1 thus obtained.

Said multiplier 22 multiplies, by a preset coefficient 1.5 (case where the coefficient K is 1.5), the least correlation value Sl as detected in said least correlation value detecting portion 20, and outputs the product 1.5×S1.

Said delaying portion 24 delays the correlation value obtained in said correlation value operation part 13 by the time required for the signal processing of said least correlation value detecting portion 20 and multiplier 22.

Said correlation value converting portion 26 converts, into set correlation value "0" (zero, case of set correlation value S2=0), the correlation value not more than the product 1.5×S1 from among the correlation values obtained in said correlation value operation part 13 and delayed by the predetermined time in said delaying portion 24.

Said motion vector generating portion 14 compares the correlation values output from said correlation value converting portion 26 with each other, detects the correlation value corresponding to the block nearest to the origin (for example, ZB33 portion in FIG. 4(*a*)) from among the plural set correlation values "0", generates a displacement vector whose starting point and end point are the block position corresponding to said detected correlation value and the origin, respectively, and outputs this vector to the output terminal 16 as the motion vector of the block to be detected of the current frame picture.

Said moving image correcting portion 11 corrects the image signal as input into said input terminal 15 on the basis of the motion vector as detected in said motion vector detecting portion 10A, and outputs this image signal to the PDP side through the intermediary of the output terminal 16.

Now we will describe the action of FIG. 9 referring concomitantly to FIG. 10.

For descriptive purpose, we hereby assume that the detection area KR of the preceding frame be 81 blocks centered on the origin (position of block ZB55 of preceding frame corresponding to block GB55 forming the subject of detection of the current frame) as was the case shown in FIG. 6. It is also assumed that the correlation values as obtained in the correlation value operation part 13 for the blocks ZB11 to ZB99 in the detection area KR have changed into the correlation value data 1 (same value as in FIG. 6) as shown in FIG. 10(*a*) due to noise, fluctuation or the like. Namely, we suppose that the correlation value corresponding to the block ZB65 near the origin of the preceding frame picture (position of block ZB55) from among the correlation value data 1 has changed from its intrinsic "0" into "10" and the correlation value corresponding to the block ZB82 away from the origin has changed from its intrinsic "20" into the least "9", and that no correlation values corresponding to any other blocks have changed.

(1) The least correlation value detecting portion 20 detects the least correlation value "9" (S1=9) with the highest correlation from among the correlation value data 1 as obtained in the correlation value operation part 13, while the multiplier 22 multiplies, by a coefficient 1.5 (K=1.5), the least correlation value "9", and outputs the product "13.5" (k×S1−13.5).

(2) The correlation value converting portion 26 converts into set correlation value "0" (case of S2=0) the correlation value not greater than the product "13.5" from among the correlation value data 1 as obtained in the correlation value operation part 13 and delayed, by the predetermined time, in the delaying portion 24, and then outputs the correlation value data 2 as shown in FIG. 10(*b*). That is, the correlation value converting portion 26 converts into the set correlation value "0", the correlation values "12", "10", "12", "12" and "9" corresponding to the blocks ZB64, ZB65, ZB66, ZB75 and ZB82 whose correlation values are not greater than the product "13.5" to widen the range forming the subject of detection.

(3) The motion vector generating portion 14 compares the respective correlation values of the correlation value data 2 output from said correlation value converting portion 26 with each other, detects the correlation value corresponding to the block ZB65 nearest to the origin from among the plural set correlation values "0" (correlation values corresponding to the blocks ZB64, ZB65, ZB66, ZB75, and ZB82), generates a displacement vector whose starting point and end point are the position of the block ZB65 nearest to said detected correlation value and the origin, respectively, and outputs this vector to the output terminal 16 as a motion vector. That is, it outputs to the output terminal 16 a correct motion vector with horizontal vector "0" and vertical vector "1".

This configuration allows the prevention of any output of erroneous motion vectors from the motion vector detecting portion 10A due to noise, fluctuation or the like, avoiding thereby the degradation of the picture quality by moving image correction at the moving image correcting portion.

Although we have described the foregoing embodiment assuming that the set correlation value S2 converted by the correlation values converting portion is "0", this invention is not limited to such an embodiment. The set correlation value S2 may be any value if only it is less than the least correlation value Sl as detected in the least correlation value detecting portion ("5" for example).

Although the foregoing embodiment has been described assuming a case where the coefficient K by which the multiplier multiplies the least correlation value S1 ("9" for example) is 1.5, this invention is not limited to any such embodiment. The coefficient may be any value if only it is greater than 1 so that the intrinsic least correlation value (for example, correlation value "10") should fall within the range forming the subject of the detection of the motion vector despite the dispersion in correlation value due to noise, fluctuation or the like.

Though, in the foregoing embodiment, the correlation value operation part is so designed to calculate the correlation value taking the plural peripheral blocks (9×9=81 blocks for example) centered on the block of the preceding frame picture (ZB55 for example) at the position corresponding to the block forming the subject of detection (GB55 for example) as the detection area KR of the motion vector, this invention is not limited to such an embodiment. For instance, the detection area KR of the motion vector may be a certain area (5×5=25 blocks, for example) centered on the corresponding block ZB33 of the preceding frame picture (block corresponding to GB33) as shown in FIG. 4(*a*), or some area (5×5=25 blocks, for example) including the corresponding block of the preceding frame picture at any position other than the center.

Figure 11:
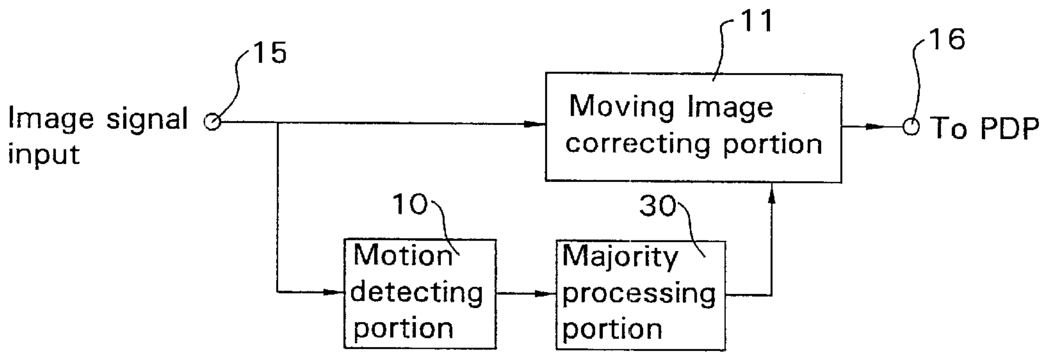
FIG. 11 is a block diagram showing an embodiment of the moving image correcting circuit of the second invention.
Figure 12A:
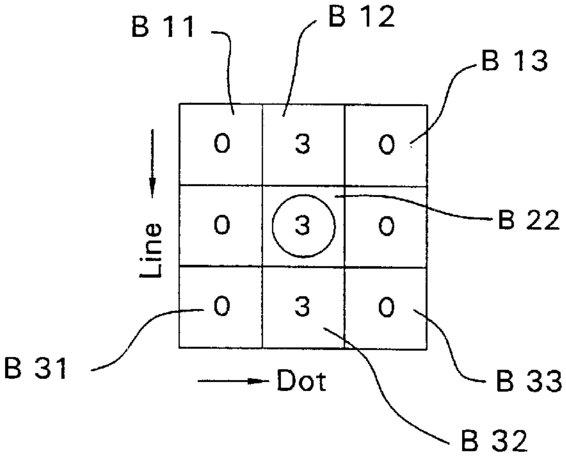
FIG. 12 illustrates an exemplary detected value of the motion vector of the blocks within the set range S when an image of vertical, horizontal, and oblique lines, each being one line, displaces toward a predetermined direction, wherein (a) illustrates the detected values in the case of a vertical line image, (b) those of a horizontal line image, (c) those of a left-to-right descending oblique line image, and (d) those of left-to-right ascending oblique line image.
Figure 12B:
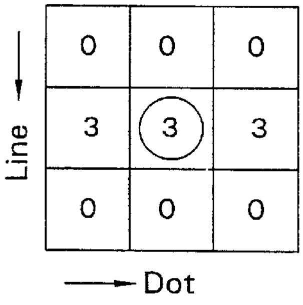
Figure 12C:
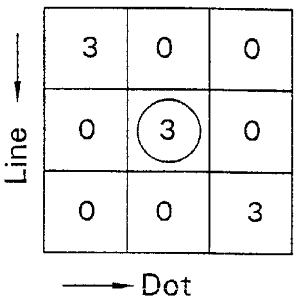
Figure 12D:
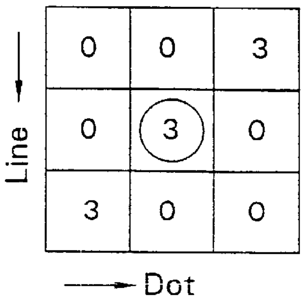

FIG. 11 shows an embodiment of the moving image correcting circuit of the second invention, wherein like reference characters designate like or corresponding parts as in FIG. 2. In FIG. 11, the numeral 10 represents a motion vector detecting portion, 11 a moving image correction portion, and 30 a majority processing portion.

Figure 7A:
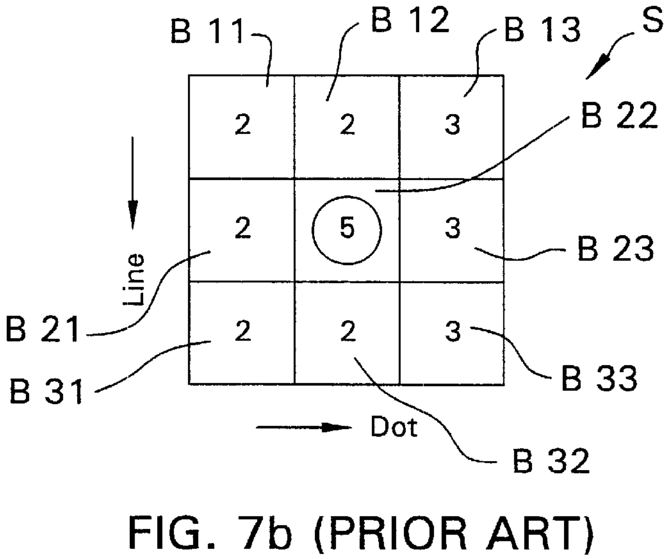
FIG. 7a (PRIOR ART)
FIG. 7 is an explanatory diagram showing a case where the detected value of a motion vector of the subject block B22 becomes greatly different from those of peripheral blocks B11 to B33 (except B22) because of noise, fluctuation or the like, wherein (a) gives a case where the blocks with "2" as detected value are the most numerous among the blocks B11 to B33 within the set range S, and (b) is an explanatory diagram showing a case where the number of blocks with "2" and that with "3" as detected values are the greatest and identical with each other among the blocks B11 to B33 within the set range S.
Figure 7B:
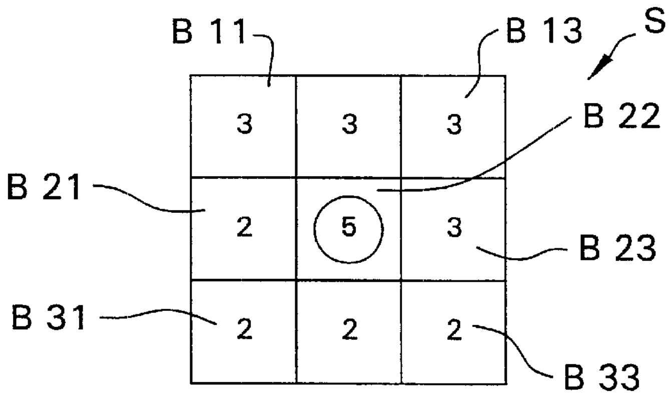
FIG. 7b (PRIOR ART)
Figure 8:
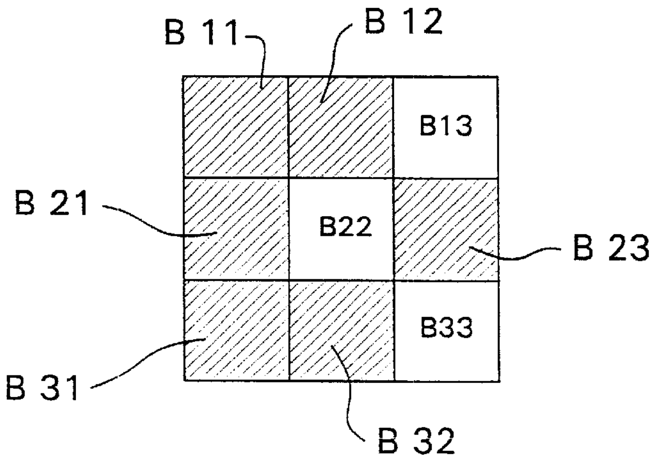
FIG. 8 (PRIOR ART)
FIG. 8 is an explanatory illustration showing a case where noise, fluctuation or the like prevented the detection of the motion vector of the subject block (motion vector MV22=0) among the nine blocks B11 to B33 in the moving image portion.

Said majority processing portion 30 seeks after and outputs the most numerous, identical detection values from among the detected values by said motion vector detecting portion 10 for the blocks in the set range S including the subject block. As shown in FIG. 7(*a*), for instance, if the detected value of the subject block B22 is “5”, the detected value of peripheral blocks B11, B12, B21, B31, and B32 is “2” and the detected value of B13, B23, and B33 is “3”, then the blocks of detected value “2” is the most numerous (5). So this detected value “2” is determined as such and output by the majority processing portion 30.

Based on the detected value (“2” for example) output from said majority processing portion 30, said moving image correcting portion 11 corrects the display positions of the respective subfields (SFn to SF1) to the pixels in the subject block B22 as input into said input terminal 15, and outputs the corrected signal to the PDP through the intermediary of the output terminal 16.

Now we will describe the action of FIG. 11 referring concomitantly to FIG. 7(*a*).

For purpose of discussion, it is presupposed as shown in FIG. 7(*a*) that the set range S embraces nine blocks including the block B22, the subject of processing and its peripheral blocks B11 to B33 (except B22) and that a part of the detection values of the motion vector detecting portion 10 has been changed from the intrinsic value into a differing one due to noise, fluctuation or the like. We assume, namely, that the detected value of the motion vector of the subject block B22 has changed from its intrinsic value (“2” for example) into “5” and that the peripheral blocks B11 to B33 (except B22) have not been subjected to the influence of any noise nor fluctuation. Note that the detected values “5”, “2”, and “3” as shown in FIG. 7(*a*) represent the displacement amount (5, 2, and 3 dots/frame, for example) in a certain direction (upward for example). From this it results that the detected values “−5”, “−2” and “−3” (not shown) represent the displacement amount (5, 2, and 3 dots/frame, for example) in the opposite direction.

(1) The majority processing portion 30 seeks after the most numerous, identical detected value “2” from among the detected values “5”, “2” and “3” by the motion vector detecting portion 10 for the blocks B11 to B33 within the set range S including the subject block B22.

(2) The moving image correcting portion 11 outputs, to the PDP through the intermediary of the output terminal 16, the signal that has corrected the display positions of the subfields SFn to SF 1 (n in number) of the pixels within the subject block B22, based on the detection value “2” as obtained in the majority processing portion 30.

Thus, even if the detected value of the subject block B22 becomes a value (“5”) away from the detected values (“2”, “3”) of the peripheral blocks B11 to B33 due to noise, fluctuation or the like, the majority processing may eliminate the protruded value (“15”), preventing thereby the degradation of the picture quality in the moving image correction.

In the foregoing embodiment, the majority processing portion has been so designed that the most numerous, identical detection values (“2” in the case of FIG. 7(*a*)) are searched for from among the detected values by the motion vector detecting portion for the blocks within the set range S, but this invention may not be limited to such a configuration. This invention is also applicable to any cases where the blocks in the set range S are ranked, and when there are numerous, identical detection values as determined by a majority processing method, the detection value of higher rank may be sought after from among these plural, identical detection values.

Let us presume, for instance, that the first rank be given to the subject block B22, and the second to ninth ranks assigned to the peripheral blocks B11 to B33 (except B22) in the sequential order of B11, B12, B13, B21, B23, B31, B32, and B33. The majority processing portion under these ranking conditions seeks after and outputs the most numerous, identical detection value “2” when the detected values of the motion vector are as shown in FIG. 7(*a*), as was in the case of the preceding embodiment. If, however, as shown in FIG. 7(*b*), the detected value of the blocks B11, B12, B13 and B23 is “3”, the detected value of the blocks B21, B31, B32 and B33 is “2” and both block number is 4 (not to be determined by majority processing method), it searches for and outputs the detected value “3” of the block B11 of the highest rank. It goes without saying that the above ranking is for reference purposes only, and that this invention may not be limited to such a ranking.

The foregoing embodiment has been so designed as to prevent the degradation of the picture quality of the moving image in the moving image correction by eliminating any protruded value through majority processing (including the cases with and without ranking). However, we have exceptional cases where the majority processing is not enough to solve the problem.

In such a case where a certain amount (3 dots/frame for example) of an image with a vertical line is displacing toward a predetermined direction (horizontal, for example), the detected value of the motion vector detecting portion 10 becomes “3” both for the subject block and the peripheral blocks B12, and B32, and “0” for any other peripheral blocks B11, B13, B21, B23, B31, and B33, as shown in FIG. 12(*a*).

The majority processing therefore resulted in the output of “0”, the most numerous detection value, and this was problematical in that the moving image correcting portion 11 thus considered that there was no motion of the subject block B22. In such a case where an image with one horizontal line or one with an oblique line is displaced toward a predetermined direction (3 dots/frame, for example), the detected values of the motion vector detecting portion 10 become as shown in FIGS. 12(*b*),(*c*) and (*d*), which is similarly problematical.

Figure 13:
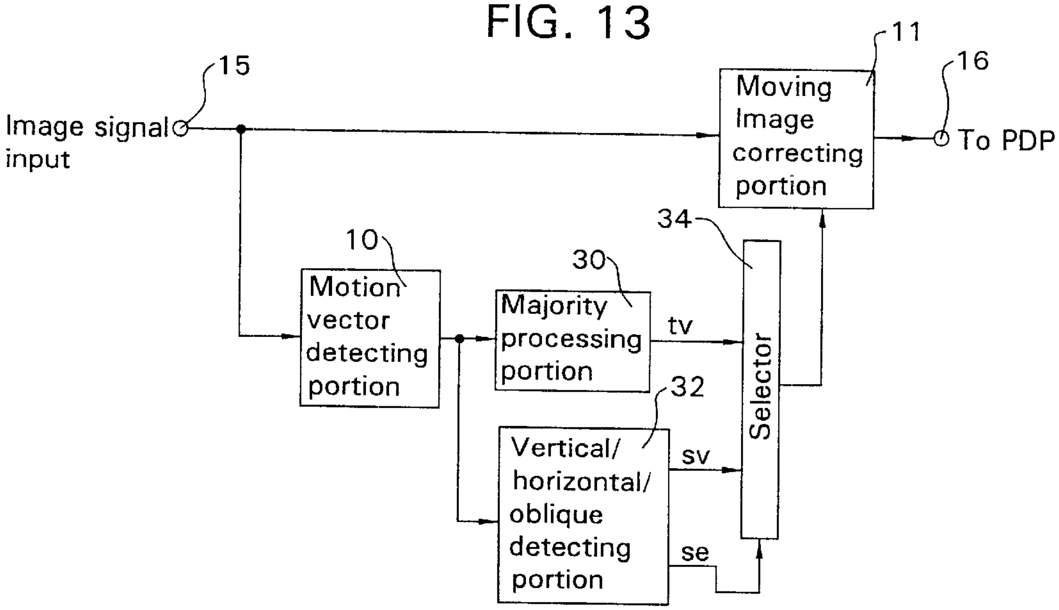
FIG. 13 is a block diagram showing an embodiment of a moving image correcting circuit of the third invention.
Figure 14A:
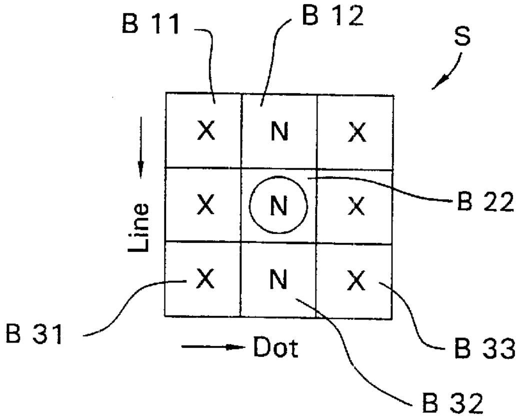
FIG. 14 illustrates yet another exemplary detected value of the motion vector of the blocks within the set range S when an image of vertical, horizontal, and oblique lines, each being one line, displaces toward a predetermined direction, wherein (a) illustrates the detected values in the case of a vertical line image, (b) those of a horizontal line image, (c) those of a left-to-right descending oblique line image, and (d) those of a left-to-right ascending oblique line image.
Figure 14B:
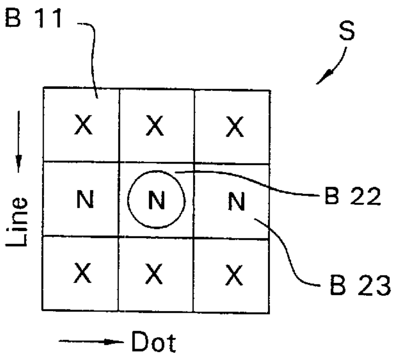
Figure 14C:
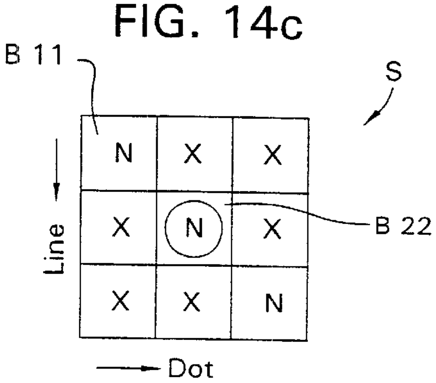
Figure 14D:
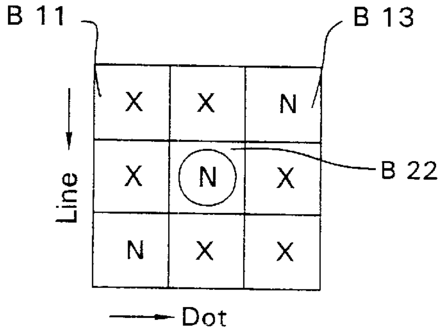

FIG. 13 shows an embodiment of the moving image correcting portion of the third invention, contrived to solve problems such as above. Like reference characters designate like or corresponding parts as in FIG. 11.

In FIG. 13, the numeral 32 represents a vertical/horizontal/oblique detecting portion and 34 a selector.

Said vertical/horizontal/oblique detecting portion 32 determines if the blocks with identical detected values by the motion vector detecting portion 10 have been continuously arranged either vertically, horizontally or obliquely including the subject block B22 within the set range S. and outputs, when detecting, said identical detected values (for example, the detected value of the subject block B22).

When there exists a detected output "se" (H level, for example) of said vertical/horizontal/oblique detecting portion 32, said selectors 34 select the detected value "sv" (motion vector) as output by this vertical/horizontal/oblique detecting portion 32, and if the same "se" does not exist (L level for example), it selects the detected value "tv" (motion vector) as obtained from the majority processing portion 30.

When, for that reason, the detected value by the motion vector detecting portion 10 corresponds to the vertical line image, which is a particular value "N" (N=3 for example) for the subject block B22 and peripheral blocks B12 and B32, and an indefinite value "X" (X=0 or 1, for example) other than N for any other peripheral blocks B11, B13, B21, B23, B31 and B33, the selector 34 selects the detected value "N" (sv=N) through the detected output "se" of the vertical/horizontal/oblique detecting portion 32, and the moving image correcting portion 11 outputs to the PDP through the intermediary of the output terminal 16 the signal that corrected the display positions of the subfields SFn to SF1 (n in number) for the pixels in the subject block B22 based on the detected value "N" chosen at the selector 34.

The action is similar to the foregoing case of vertical line image, when the detected values by the motion vector detecting portion 10 correspond, as shown in FIGS. 14(*b*), (*c*), and (*d*) respectively, to the image of a horizontal line, left-to-right descending line and left-to-right ascending line.

When, on the other hand, the detected values by the motion vector detecting portion 10 differ from those shown in FIGS. 14(*a*),(*b*), (*c*), and (*d*) (for example, they do not correspond to the image of vertical, horizontal, and oblique lines), there is no detection output "se" of the vertical/horizontal/oblique detecting portion 32 (L level for example). Therefore, the selector 34 will output the detected value "tv" as output by the majority processing portion 30, while the moving image correcting portion 11 corrects the display positions of subfields SFn to SF1 (n in number) for the pixels in the subject block B22, based on the detection value "tv" chosen at the selector 34.

In the foregoing embodiment, we described a case of the range within which the majority processing portion makes a decision by majority, the range forming the subject of the vertical/horizontal/oblique detecting portion, that is, the case where the set range S embraces 3×3=0 blocks. This invention however is understood as not to be so limited. The invention is also available for such a case where the set range S is 5×5=25 blocks.

Figure 15:
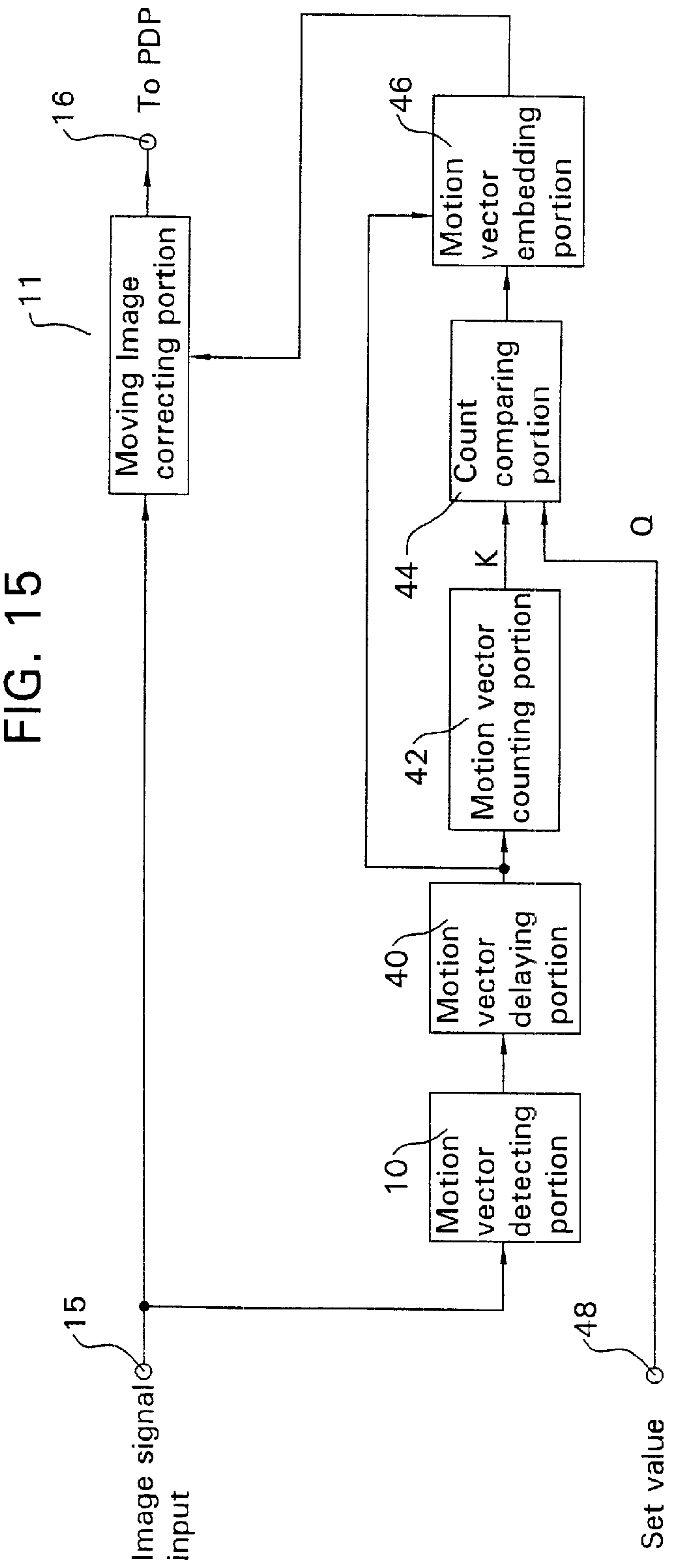
FIG. 15 is a block diagram showing an embodiment of the fourth invention.

FIG. 15 illustrates an embodiment of the moving image correcting circuit of the fourth invention, in which like reference characters designate like or corresponding parts as in FIG. 2. In FIG. 15, the numeral 10 represents the motion vector detecting portion, 11 the moving image correcting portion, 40 the motion vector delaying portion, 42 the motion vector counting portion, 44 the count comparing portion, and 46 the motion vector embedding portion.

Said motion vector delaying portion 40 delays the detected value of said motion vector detecting portion 10 to output the motion vector of respective blocks in the set range S (3×3=9 blocks, for example) composed of the subject block and peripheral blocks.

Figure 16:
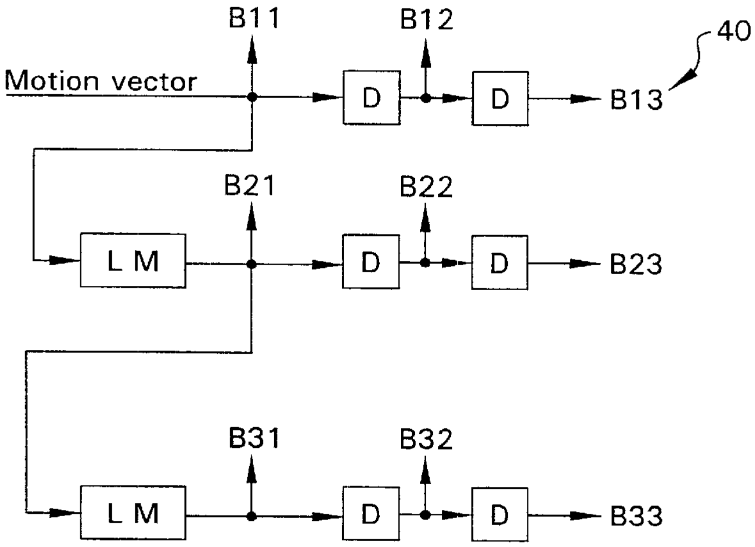
FIG. 16 is another block diagram that shows the motion vector delaying portion in FIG. 15.
Figure 17A:
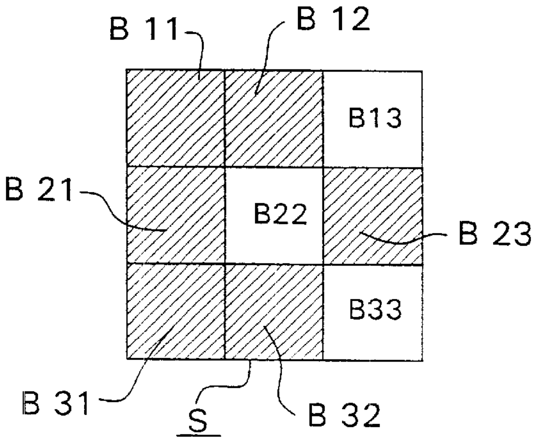
FIG. 17 shows the blocks with and without motion vectors within the set range S (3×3 blocks), in which (a) illustrates a case where the number K of blocks with a motion vector is equal to or more than the set value Q (=5) (case of embedding), and (b) a case where the number K of blocks with a motion vector is less than the set value Q (=5) (case without embedding).
Figure 17B:
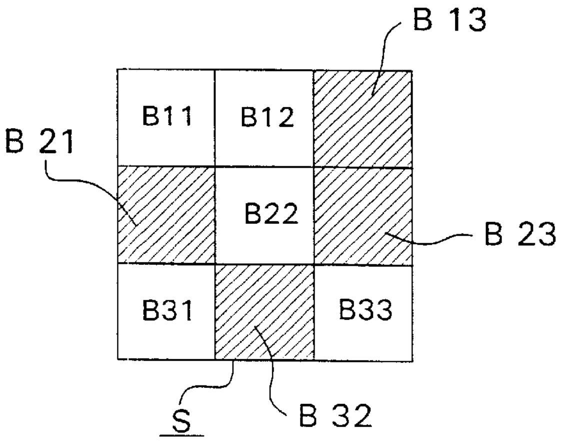

Said motion vector delaying portion 40 combines, as shown in FIG. 16, six 1-dot delaying element D to D and two 1-line delaying element LM and LM. Based on the motion vector as input, this delaying portion 40 outputs the motion vectors of respective blocks within the set range S (3×3=9 blocks), including the subject block B22 and its peripheral blocks B11 to B33 (except B22) as shown in FIGS. 17(*a*) and (b). The 1-dot delaying element D comprises D-FF (Flip-Flop), while 1-line delaying element LM comprises line memory.

Based on the motion vector output from said motion vector delaying portion 40, said motion vector counting portion 42 counts up the number of the blocks detected as having motion vectors in all the blocks B11 to B33 within the set range S to output this count K.

Said count comparing portion 44 compares the count K by said motion vector counting portion 42 with the set value Q as input into the set value input terminal 48, and outputs a comparison signal (H-level signal, for example) if K≧Q.

Said motion vector embedding portion 46 outputs, as the motion vector of the subject block, the motion vector of the block with higher priority from among the blocks detected as having a motion vector within the set range S, when said count comparing portion 44 outputs a comparison signal (H-level signal for example) and there is no motion vector of the subject block B22 to be output from said motion vector delaying portion 40 (namely, when the motion vector detecting portion 10 detects no motion vector for the subject block B22), and outputs the motion vector of the subject block B22 to be output from said motion vector delaying portion 40 in other cases than the above. If, for instance, the set range S embraces the nine blocks as shown in FIG. 17(*a*) and the blocks detected as having the motion vector are B11, B12, B21, B23, B31, and B32 (case of K≧Q) as hatched in the same drawing, the blocks B11 to B33 (except B22) other than the subject block B22 are ranked beforehand (for example, into a sequential order of: B21, B23, B12, B32, B11, B13, B31, and B33) and the motion vector of the subject block with a higher rank (block B21 for example) from among the blocks detected as having motion vector B11, B12, B21, B23, B31, and B32 is output as the motion vector of the subject block B22.

Said moving image correcting portion 11 outputs to the PDP through the output terminal 16 the signal that corrected the display position of the subfields SFn to SF1 (n in number) of each frame of pixels in the subject block, based on the motion vector as output from said motion vector embedding portion 46. In the case as shown in FIG. 17(*a*), for instance, the signal that corrected the display positions of the subfields SFn to SF1 (n in number) of each frame of pixels in the subject block B22 is output to the PDP through the output terminal 16, based on the motion vector (the motion vector of block B21 for example) as output from said motion vector embedding portion 46.

We will now describe the action of FIG. 15 concomitantly referring to FIGS. 16 and 17.

For purpose of discussion, we herein assume, as shown in FIGS. 17(*a*) and (*b*), that the set range S embraces nine blocks consisting of the subject block B22 to be processed and of its peripheral blocks B11 to B33 (except B22) and priority is given beforehand to these peripheral blocks in the sequential order of B21, B23, B12, B32, B51, B13, B31, and B33, and that the set value Q of the count comparing portion 44 is 5.

(1) Based on the n-bit image signal as input into the input terminal 15, the motion vector detecting portion 10 detects the motion vector (displacement direction and displacement amount) of a single frame or inter-frame blocks, and the motion vector delaying portion 40 outputs the motion vectors MV11 to MV33 of respective blocks B11 to B33 in the set range S based on the motion vector as output from the motion vector detecting portion 10. Based in turn on the motion vector output from the motion vector delaying portion 40, the motion vector counting portion 42 counts up the number of the blocks detected as having the motion vector out of all the blocks B11 to B33 within the set range S to output the count K.

If, as shown in FIG. 17(*a*), there are six blocks detected as having a motion vector (shown as hatched) out of all the nine blocks within the set range S, the count K to be output from the motion vector counting portion 42 is 6 (K=6). If the number of the blocks detected as having a motion vector is 4 instead as shown in FIG. 17(*b*), the count K to be output form the motion vector counting portion 42 will be four (K=4).

(2) When, as shown in FIG. 17(*a*), there is no motion vector of the subject block B22 (MN22=0) and K=6, it becomes that K≧Q (Q=5). Therefore, the count comparing portion 44 outputs the comparison signal (Hlevel signal, for example). Hence, the motion vector embedding portion 46 outputs, as the motion vector of the subject block B22, the motion vector MV21 of the block B21 having higher priority from among the blocks detected as having a motion vector in the set range S. That is, the motion vector MV22 (=0) of the subject block B22 is embedded by the motion vector MV21 of the block B21.

(3) Based on the motion vector MV21 embedded by the motion vector embedding portion 46, the moving image correcting portion 11 outputs to the PDP through the output terminal 16 the signal that corrected the display positions of the subfields SFn to SF1 (n in number) of the pixels in the subject block B22. Therefore, even when the motion vector of the subject block B22 intrinsically to be detected by the motion vector detecting portion 10 cannot be detected because of noise, fluctuation or the like, the display position may be corrected of the subfields SFn to SF1 (n in number) for the pixels in the subject block B22, based on the motion vector MV21 as embedded at the motion vector embedding portion 46.

(4) When, as shown in FIG. 17(*b*), there is no motion vector of the subject block (MV22=0) and K=4, it becomes that K<Q (Q=5). Therefore, the count comparing portion 44 does not output the comparison signal (L-level signal is output, for example). Hence, the motion vector embedding portion 46 outputs the motion vector MV22 (=0), as such, namely as the motion vector of the subject block B22. That is to say, the motion vector MV22 (=0) of subject block B22 cannot be embedded by the motion vector of the peripheral blocks. Therefore, the moving image correcting portion 11 does not correct the display position of the subfields SFn to SF1 for the pixels in the subject block B22.

(5) If there exists the motion vector of the subject block B22 (case of MV22≠0), the motion vector embedding portion 46 outputs the motion vector MV22 as the motion vector of the subject block B22. That is, if MV22≠0, the motion vector of the subject block B22 is not embedded by the motion vector of the peripheral blocks whether the count comparing portion 44 outputs the comparison signal or not. Hence, based on this motion vector MV22 (≠0), the moving image correcting portion 11 outputs to the PDP through the output terminal 16 the signal that corrected the display positions of the subfields SFn to SF1 (n in number) of the pixels in the subject block B22.

In the foregoing embodiment, the peripheral blocks in the set range S are arranged beforehand by priority, adopting the motion vector (MV21 for example) of the blocks with higher priority order from among the blocks detected as having a motion vector in the set range S, as a motion vector to be embedded, when there is no motion vector of the subject block B22 (MV22=0) and that the motion vector is to be embedded by the motion vector embedding portion. However, this invention is understood as to not be limited to this sort of embodiment.

For instance, we may embed a no motion vector of the subject block B22 (MV22=0) by the mean value of the motion vectors of the blocks detected as having a motion vector in the set range S. In the case of FIG. 17(*a*), more materially, the following formula (1):

$$MVm=(MV11+MV12+MV21+MV23+MV31+MV32)/6 \tag{1}$$

will allow to have the mean value MVm of the motion vectors MV11, MV12, MV21, MV23, MV31, and MV32 of the blocks B11, B12, B21, B23, B31, and B32 detected as having motion vectors in the set range S to embed, by this mean value MVm, the no motion vector of the subject block (MV22=0).

Though in the foregoing embodiment the description has been given assuming that the set value Q of the count comparing portion is 5, this invention may not be limited to such an embodiment.

Furthermore, in the foregoing embodiment, the description was made assuming a case where the set range S comprises the subject block and its eight peripheral blocks (9 in all). But the invention should not be limited to such an embodiment; similar embodiments will be available also for other cases where the set range S comprises n×m blocks (5×5 blocks for example).

Figure 18:
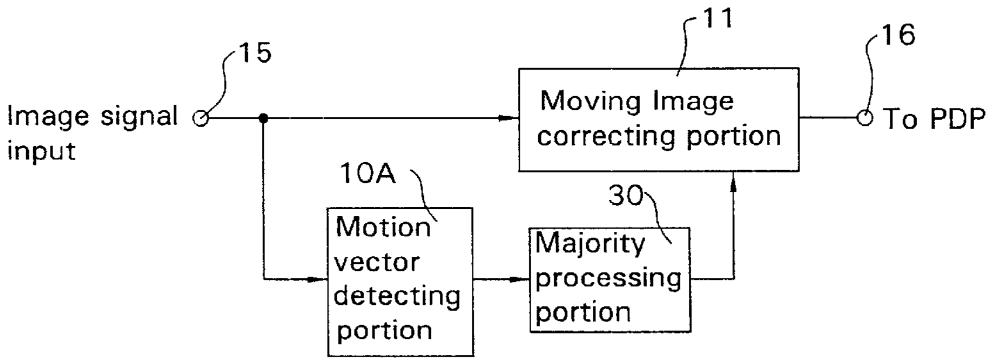
FIG. 18 is a block diagram showing an embodiment of the moving image correcting circuit of the fifth invention.

FIG. 18 shows an embodiment of the moving image correcting circuit of the fifth invention, wherein the motion vector detecting portion 10 in the embodiment of the second invention, shown in FIG. 11, is replaced by the motion vector detecting portion 10A I the embodiment of the first invention.

Figure 19:
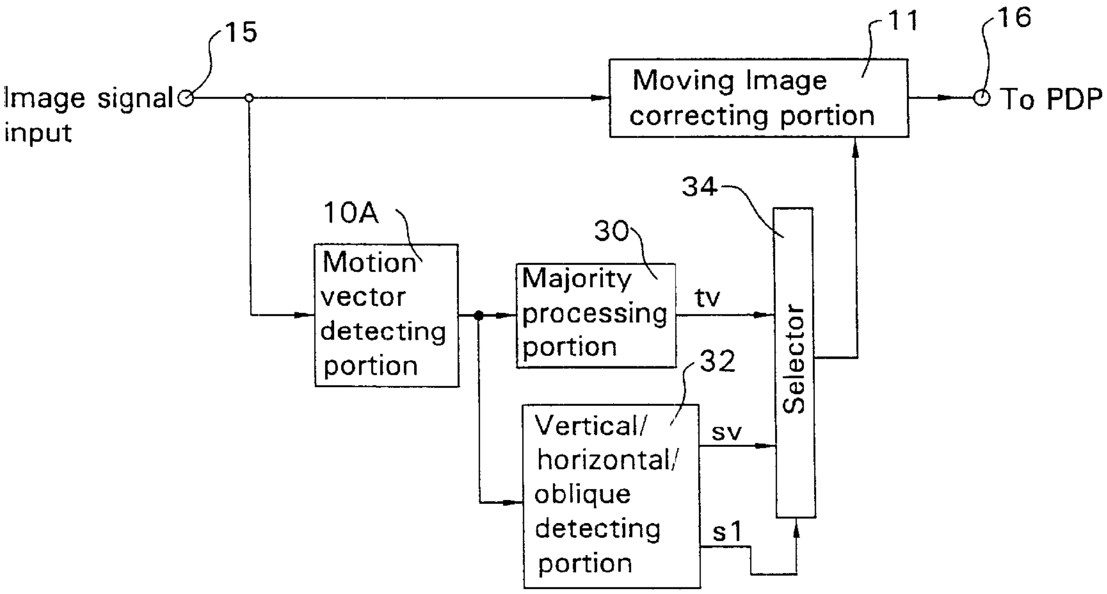
FIG. 19 is a block diagram showing an embodiment of the moving image correcting circuit of the sixth invention.

FIG. 19 shows an embodiment of the moving image correcting circuit of the sixth invention, wherein the motion vector detecting portion 10 in the embodiment of the third invention, shown in FIG. 13, is replaced by the motion vector detecting portion 1OA in the embodiment of the first invention.

Figure 20:
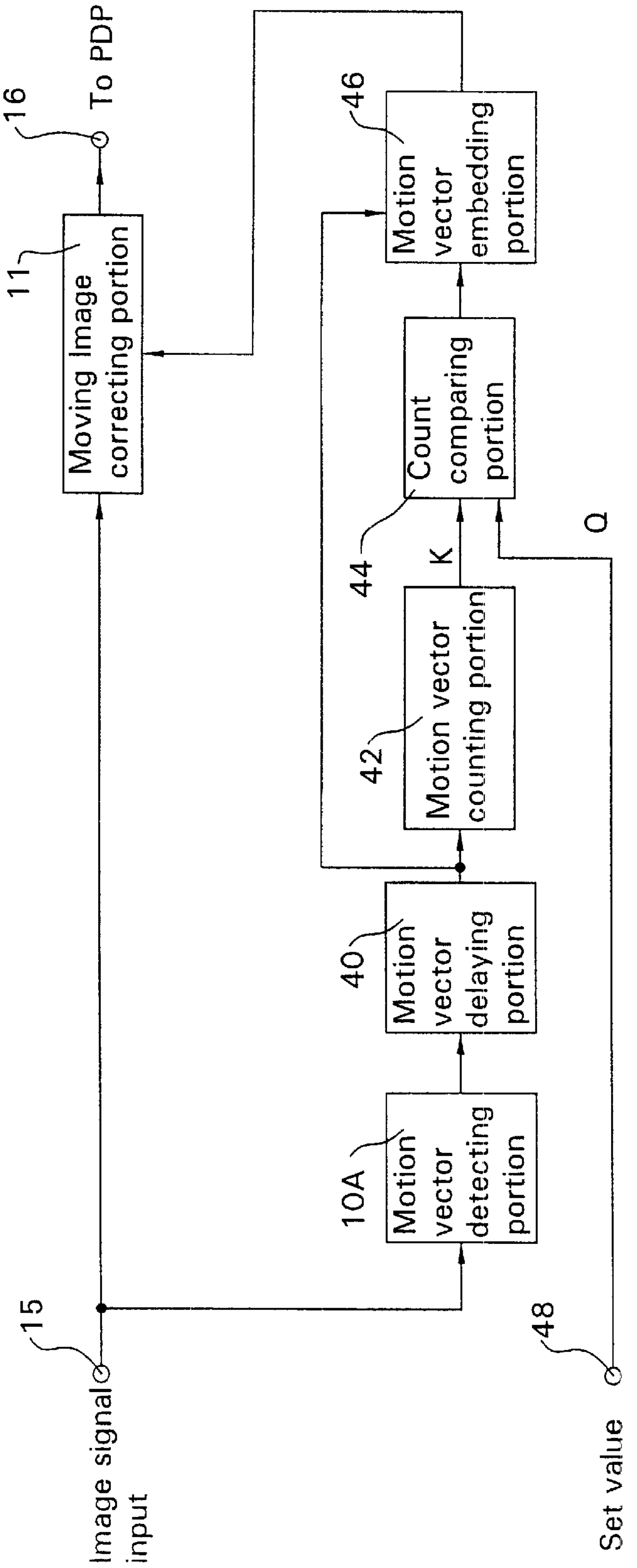
FIG. 20 is a block diagram showing an embodiment of the moving image correcting circuit of the seventh invention.

FIG. 20 shows an embodiment of the moving image correcting circuit of the seventh invention, wherein the motion vector detecting portion 10 in the embodiment of the fourth invention, shown in FIG. 15, is replaced by the motion vector detecting portion 1OA in the embodiment of the first invention.

The moving image correcting circuit as shown in FIGS. 18, 19, and 20 keeps any erroneous motion vector from being output from the upstream motion vector detecting portion 10A in such a fashion that no erroneous motion vector should enter the moving image correcting portion in the downstream circuit, even if this motion vector detecting portion 10A outputs any erroneous vector. The circuit thus may avoid, with yet a higher accuracy, the degradation of picture quality at the time of the correction of the moving image.

In the foregoing embodiment, the description has been made wherein a display device utilizes a PDP. This invention, which should not be limited to such an embodiment, may also be applicable to a digital display unit (for instance, a display using a LCD panel).

Industrial Availability

In a display device (for example, a display using a PDP or LCD panel) that displays a multitonal image by time-sharing one frame into plural subfields and emitting the subfields corresponding to the luminance level of an input image signal, this invention may be used to protect the picture quality from degrading due to the noise in and fluctuation of the input image signal when correcting the moving image.

What is claimed is:

1. A moving image correcting circuit in a display device that displays multitonal image by time-sharing one frame into plural subfields and emitting the subfields corresponding to the luminance level of an input image signal, characterized in that said display unit is provided with a motion vector detecting portion that detects the motion vector of a single frame or inter-frame blocks based on said input image signal and with a moving image correcting portion that outputs to said display unit the signal that corrected the display positions of respective subfields for the pixels in said blocks on a basis of the detected value from said motion vector detecting portion, said motion vector detecting portion having a correlation value operation part that computes the correlation value of the image signal corresponding to all the blocks in the detection area of the preceding frame picture, a least correlation value detecting portion that detects the least correlation value S1 endowed with the highest correlation from among plural correlation values as obtained in this correlation value operation part, a multiplier that multiplies this least correlation value S1 by a coefficient K, with K>1, a correlation value converting portion that replaces the plural correlation values obtained in said correlation value operation part that are not greater than the product K×S1 with the set correlation value S2, with S2≦S1, to output the value thus replaced, a motion vector generating portion that detects a correlation value corresponding to the block nearest to the origin from among the set correlation value S2 to be output from said correlation value converting portion, generates a displacement vector whose starting and end points are the position of the block corresponding to said detected correlation value and the origin respectively, and outputs this displacement vector as a motion vector.

2. The moving image correcting circuit for display as claimed in claim 1, wherein the correlation value operating part computes the correlation value of the image signal taking the plural peripheral blocks centered on the origin as the detection area of the preceding frame picture.

3. The moving image correcting circuit for display as claimed in claim 1, wherein the multiplier multiplies the least correlation value S1 as detected in the least correlation detecting portion by 1.5, where the coefficient K is 1.5.

4. A moving image correcting circuit in a display device that displays a multitonal image by time-sharing one frame into plural subfields and emitting the subfields corresponding to the luminance level of an input image signal, characterized in that said moving image correcting circuit has a motion vector detecting portion that detects the motion vectors of a single-frame or inter-frame blocks on the basis of said input image signal, a majority processing portion that obtains the most numerous, identical detected values from among the detected values by said motion vector detecting portion of all the blocks in the set range S including the subject block, and a moving image correcting portion that outputs to said display unit the signal that corrected the display portions of respective subfields for the pixels in said subject block, on the basis of the detected values as obtained in said majority processing portion.

5. A moving image correcting circuit in a display device that displays a multitonal image by time-sharing one frame into plural subfields and emitting the subfields corresponding to the luminance level of an input image signal, characterized in that said moving image correcting circuit has a motion vector detecting portion that detects the motion vectors of a single-frame or inter-frame blocks on the basis of said input image signal, a majority processing portion that obtains the most numerous, identical detected values from among the detected values by said motion vector detecting portion for the blocks in the set range S including the subject embodiment, a vertical/horizontal/oblique detecting portion that detects whether or not the blocks detected, by said motion vector detecting portion, as having identical detected values have been arranged continuously either vertically, horizontally or obliquely, including said subject block within said set range S, and outputs said identical detected values when detecting, a selector that chooses the detected value output by said vertical/horizontal/oblique detecting portion if there is a detection output of this vertical/horizontal/oblique detecting portion and selects the detected value as obtained in said majority processing portion if there is no detection output from said vertical/horizontal/oblique detecting portion, and a moving image correcting portion that outputs to said display unit the signal that corrected the display positions of respective subfields for the pixels in said subject block, on the basis of the detected value as selected by this selector.

6. The moving image correcting circuit for display unit as claimed in claim 4, wherein the majority processing portion ranks the blocks in the set range S, and if there are plural detected values as obtained by majority, seeks any detected value of blocks with a higher rank from among these plural detected values.

7. A moving image correcting circuit in a display device that displays a multitonal image by time-sharing one frame into plural subfields and emitting the subfields corresponding to the luminance level of an input image signal, characterized in that said moving image correcting circuit is provided with a motion vector detecting portion that detects the motion vector of a single frame or inter-frame blocks based on said input image signal, a motion vector delaying portion that obtains the motion vectors of respective blocks in the set range S composed of the subject block and its peripheral blocks by delaying the detected values of said motion vector detecting portion, a motion vector counting portion that counts up the number of blocks detected as having motion vectors in any and all the blocks within the set range S, a count comparing portion that compares if the count of this motion vector counting portion is greater than the set value or not, a motion vector embedding portion that outputs the motion vector corresponding to the output of said count comparing portion and said motion vector delaying portion, and a moving image correcting portion that outputs to said display unit the signal that corrected the display positions of respective subfields for the pixels in the subject block, on the basis of the motion vectors as output from said motion vector embedding portion, wherein said motion vector embedding portion outputs, as the motion vector of a subject block, the motion vectors of the blocks detected as having motion vectors in the set range S when there is no motion vector of the subject block as obtained in said motion vector delaying portion and when said count comparing portion outputs a comparison signal, and outputs the motion vector of the subject block as obtained in said motion vector delaying portion in any other cases than the above.

8. The moving image correcting circuit for display unit as claimed in claim 7, wherein the peripheral blocks in the set range S are ranked beforehand, the motion vector embedding portion outputs, as the motion vector of said subject block, the motion vector of the blocks with a higher rank among the blocks detected as having the motion vector in the set range S when the count comparing portion outputs a comparison signal and when the motion vector detecting portion detects a no motion vector of said subject block.

9. The moving image correcting circuit for display unit as claimed in claim 7, wherein the motion vector embedding portion outputs, as the motion vector of the subject block, the mean value of the motion vectors of said blocks detected as having motion vectors in the set range S when the count comparing portion outputs a comparison signal and the motion vector detecting portion detects inexistence of the motion vector of said subject block.

10. The moving image correcting circuit for display unit as claimed in claim 4, wherein the motion vector detecting portion has a correlation value operation part that computes the correlation value of an image signal for all the blocks in the detection area of the preceding frame picture referring, as a datum, to the subject block of the current frame picture, a least correlation value detecting portion that detects the least correlation value S1 with the highest correlation from among the plural correlation values as obtained in said correlation value operation part, a multiplier that multiplies the least correlation value S1 by a coefficient K, with K>1, a correlation value converting portion that converts, into the set correlation value S2, with S2≦S1, a correlation value not greater than the product K×S1 among the plural correlation values as obtained in said correlation value operation part to output the value thus converted, and a motion vector generating portion that detects the correlation value corresponding to the block nearest to the origin among the set correlation values S2 output from this correlation value converting portion and generates a displacement vector whose starting point and end point are the position of the block corresponding to this detected correlation value and the origin respectively, to output said displacement vector as a motion vector.

11. The moving image correcting circuit for display unit as claimed in claim 6, wherein the motion vector detecting portion has a correlation value operation part that computes the correlation value of an image signal for all the blocks in the detection area of the preceding frame picture referring, as a datum, to the subject block of the current frame picture, a least correlation value detecting portion that detects the least correlation value S1 with the highest portion that detects the least correlation value S1 with the highest correlation from among the plural correlation values obtained in said correlation value operation part, a multiplier that multiplies the least correlation value S1 by a coefficient K, with K>1, a correlation value converting portion that converts, into the set correlation value S2, with S2≦S1, the correlation value not greater than the product K×S1 among the plural correlation values as obtained in said correlation value operation part to output the value thus converted, and a motion vector generating portion that detects the correlation value corresponding to the block nearest to the origin among the set correlation values S2 output from the correlation value converting portion and generates a displacement vector whose starting point and end point are the position of the block corresponding to the detected correlation value and the origin respectively, to output said displacement vector as a motion vector.

* * * * *